Oct. 21, 1930.　　　J. H. BECKER　　　1,779,353
TENDER CISTERN WATER INDICATOR
Filed Oct. 12, 1927
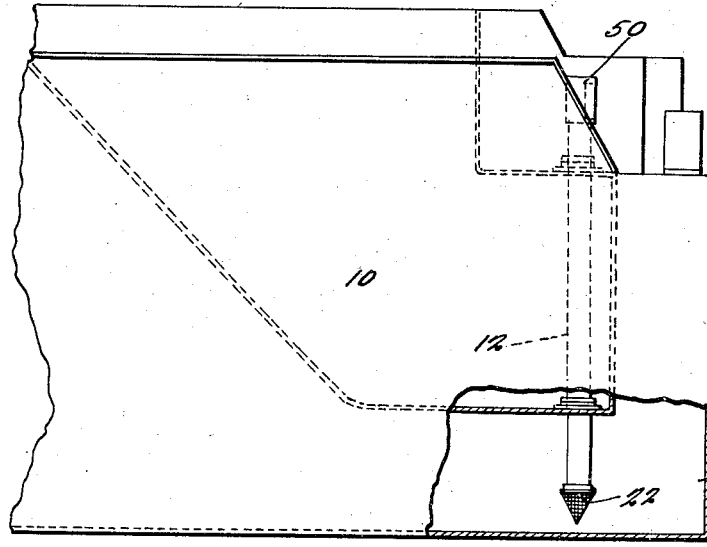
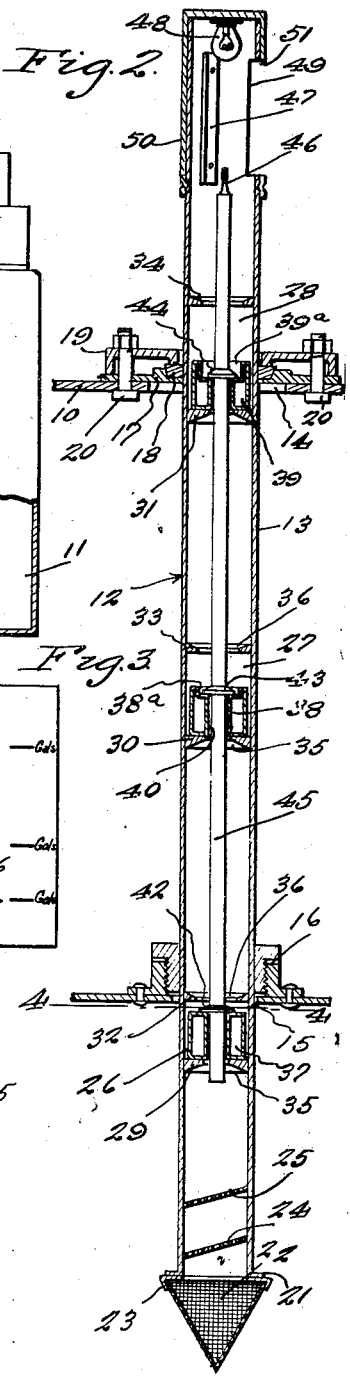
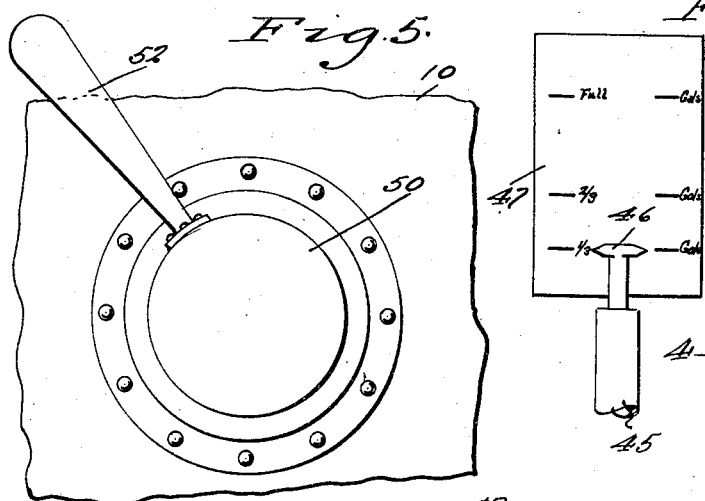
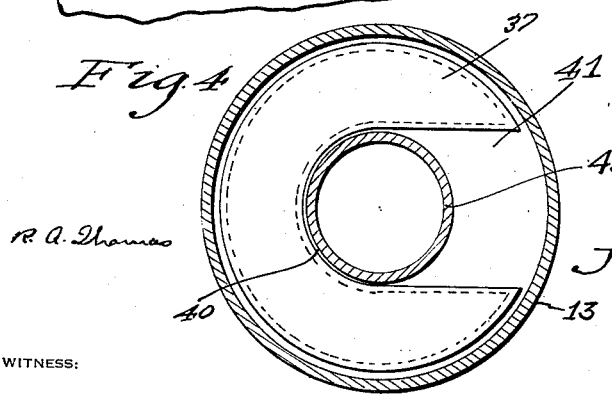
John H. Becker
INVENTOR
BY Victor J. Evans
ATTORNEY
WITNESS:

Patented Oct. 21, 1930

1,779,353

UNITED STATES PATENT OFFICE

JOHN H. BECKER, OF PITTSBURGH, PENNSYLVANIA

TENDER-CISTERN-WATER INDICATOR

Application filed October 12, 1927. Serial No. 225,745.

The present invention relates to gauges and is particularly applicable to gauging the depth of liquid in a tank.

Specifically, the device has been contrived for use in measuring the depth of water in the cistern of a locomotive tender, although it may be applied in other similar constructions, or wherever the depth of a liquid is to be indicated on a scale.

Objects of the invention are to provide a device of the character described by means of which the depth of the content of a container may be indicated on a scale of short length compared with the depth of the container.

Further objects are simplicity of construction and operation, cheapness of manufacture, and effectiveness in use.

A further object is the adaptability to various containers.

Other objects and advantages will appear from the following description and will be set forth in the subjoined claims, and I do not wish to be limited in the scope of my invention except as I shall be limited by said claims.

In the drawings:

Figure 1 shows the invention as applied to the cistern of the tender of a locomotive.

Figure 2 is a longitudinal section through the invention, showing the arrangement of the various parts thereof.

Figure 3 is a fragmentary view on an enlarged scale, showing the scale on which the depth of the liquid in the container is indicated.

Figure 4 is a section on the line 4—4 of Figure 2, enlarged in comparison with said figure and showing the relationship of the float to the central tube.

Figure 5 is a detail view showing a handle for operating the closure at the upper end of the device.

Referring to the drawings in detail, 10 designates the tender of a locomotive, 11 is the cistern therein and 12 designates the gauge which constitutes the subject of my invention and shown as applied to said tender. The gauge comprises a tubular member 13 which may be mounted on the tender and extended through apertures 14 and 15 formed therein for that purpose, the lower aperture being guarded by a gland construction 16 and the upper by a plate 17, a washer 18 and a clamping member 19, the assembly of which is held in place by means of bolts 20, the washer 18 being of flexible or elastic material and when compressed by the member 19 affording a sufficient frictional contact with the tube 13 to hold it against displacement. The tubular member 13 is open at its lower end and is provided with a laterally extending flange 21 to which a cone-shaped strainer 22 is attached by means of a centrally apertured head 23. The tube is also provided with baffles 24 and 25 located adjacent the lower end of the tube which prevents instability of the level indicator due to surging of the water under traffic conditions.

Formed within the tube 13 are float chambers 26, 27 and 28, as shown three in number, but it will be obvious when the invention is thoroughly understood that the number of float chambers may be multiplied to any desired number and to suit any given condition. In the specific application, however, a rough indication of the amount of water within the cistern is all that is necessary and in consequence the number of the float chambers provided may be limited. The float chambers 26, 27 and 28 are defined by centrally apertured bottom walls 29, 30 and 31 and top walls 32, 33 and 34 which are connected with the walls of the tube 13, the upper walls being provided with central apertures preferably of greater diameter than the apertures in the bottom walls, and the bottom walls have on their lower faces frusto-conical depressions, and the upper walls have on their upper faces inverted frusto-conical depressions, as shown at 35 and 36 respectively thereby having their adjacent faces plane and permitting full movement of the floats. Arranged within the float chambers are float members 37, 38 and 39 which are preferably in the form of hollow copper bodies hermetically sealed and having central vertical passageways 40 therethrough, said passageways having communication with a kerf 41 extending vertically from one side, as shown in Figure 4, to permit it to be placed on the tube 45. The floats 38 and 39 have preferably on their upper faces depressions 38ᵃ and 39ᵃ to receive the collars 43 and 44 respectively which pass into the recessed top of the floats, a similar collar 42 being positioned on the upper surface of the float 37 and said collar being connected with a vertically extending rod or tube 45 slidably connected with the floats 37, 38 and 39. It will be noted that the distances between the upper and lower walls of the float chambers, considering them progressively upward, are of increasing length and there is secured to the upper end of the rod 45 an indicator 46 in the nature of pointers, as shown in Figure 3 of the drawings, and positioned adjacent the pointers upon the wall of the tubular member 13 is a scale 47 having various designations thereon, as shown in Figure 3. One side of the scale member may be made to indicate to what proportion the tank is filled and on the other side may be designated the number of gallons that the former indication represents. A light may be provided within the casing, as at 48, and a window may be cut in the side thereof, as shown at 49, which window may be closed by a revolving shutter 50 having an aperture 51 therein corresponding to and adapted to be brought into alignment with the aperture 49 by the rotation of the shutter 50. The length of the scale 47, it will be noted, is considerably less than the depth of the cistern. However, the indications thereon are made to properly designate the true depth in the cistern by use of the above construction. The gauge is initially assembled in the shop by securing the bottom walls 29, 30 and 31 and the top walls 32, 33 and 34 respectively within the tube 13 by any appropriate shop kinks by prick punching or otherwise indenting the tube after having previously positioned the float members 37, 38 and 39 at the positions shown upon the rod 45. The collars 42, 43 and 44 are secured upon the rod 45 and are small enough to pass through the openings in the top walls 32, 33 and 34.

The operation of the device is as follows: When liquid within the cylinder rises to the height of the upper wall of the lowermost float compartment, the float 37 will be moved upwardly, carrying with it the rod 45 and the indicator 46 will be moved to a position opposite the lower marks on the scale, as indicated in the present showing designating that the tank is one-third full and on the opposite side of the scale the number of gallons therein may be read. The collars 43 and 44 will be moved from their seats on the two upper floats a distance equal to the distance between the lower float in its lowermost position and the lower surface of the wall 36 at the upper end of the lower float chamber. Water will flow around the float member and will pass therethrough as the water in the cistern rises to a greater depth, pushing the collar 42 off its seat in the passage thereof, the collars 42, 43 and 44 in this sense serving as valves. When the water rises to the level of the upper wall of the chamber 27, the float 38 will rise to this level, carrying the rod with it and indicating on the scale a further measurement, as in the present instance indicating that the tank is two-thirds full and contains a certain number of gallons of water. A similar operation occurs when the water has risen to the uppermost float chamber, which in the present arrangement is arranged to operate when the tank is full or substantially full, and this third indication is read on the scale as in the former cases.

By this arrangement it will be readily seen that on a comparatively short scale a considerable depth may be indicated, adapting the device for convenient use in comparatively cramped space, as in the cab of the engine to which the tender is attached, or in position on the tender such that it may be readily observed by the engineer without the necessity of his leaving his position in the cab of the engine. In order to protect the mechanism the shutter may be kept closed except when it is desired to make a reading, and the light 48 may be extinguished. A handle 52 may be provided on the shutter to facilitate the turning thereof.

Having described my invention, what I claim is:

1. A gauge for measuring the depth of liquids in a container comprising a tubular support formed with a plurality of vertically aligned and spaced float chambers therein, a float member slidably arranged for vertical movement within each of the chambers, the length of said float chambers being progressively greater upwardly through the container, an indicator member extending longitudinally of and within said container and passing through said chambers and having sliding connection with said float members and also with respect to said container, and spaced means carried by the indicator member and adapted to seat respectively upon the upper faces of the float members as they rise pursuant to the head of liquid measured.

2. A gauge for use in connection with containers to measure the depths of liquid therein comprising a tubular support, a plurality of pairs of spaced wall portions within said support, the walls of the respective pairs being of greater distance apart progressively upward through the support thereby defining float chambers therebetween of increasing height, float members arranged one within each of the chambers and normally seated upon the upper sides of the lowermost walls therefor, an indicator rod slidably connected with the float members and slidable longitudinally through the chambers within the support, collars carried by the rod and seated upon the respective float members when the liquid in the container recedes below the level of the lowermost float member, a scale at the upper end of the support, and an indicator on said rod registering with the scale to ascertain the depth of liquid in the container.

3. A liquid gauge comprising an open end tubular supporting member formed with vertically aligned and spaced float chambers therein, a float for each of the chambers, said floats having central vertical bores therethrough, said float chambers being of progressively greater length from the bottom to the top of the support, a rod slidably mounted through the bores of the floats and projecting and slidable through the chambers, collars carried by the rod and normally seated upon the upper sides of the floats about the central bores for the rod, an indicating pointer upon the upper end of the rod beyond the uppermost of the float chambers, and a scale in said tubular support opposite said pointer for cooperation with said pointer.

In testimony whereof I affix my signature.

JOHN H. BECKER.